(12) United States Patent
Fan et al.

(10) Patent No.: US 11,102,177 B2
(45) Date of Patent: Aug. 24, 2021

(54) METHOD AND DEVICE FOR DIRECTING TRAFFIC

(71) Applicant: WANGSU SCIENCE & TECHNOLOGY CO., LTD., Shanghai (CN)

(72) Inventors: Zidao Fan, Shanghai (CN); Hong Chen, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 565 days.

(21) Appl. No.: 15/774,516

(22) PCT Filed: Nov. 16, 2016

(86) PCT No.: PCT/CN2016/106056
§ 371 (c)(1),
(2) Date: May 8, 2018

(87) PCT Pub. No.: WO2018/000695
PCT Pub. Date: Jan. 4, 2018

(65) Prior Publication Data
US 2020/0259797 A1    Aug. 13, 2020

(30) Foreign Application Priority Data

Jun. 30, 2016   (CN) .......................... 201610510950.8

(51) Int. Cl.
*H04L 29/06* (2006.01)
*H04L 12/801* (2013.01)
*H04L 29/08* (2006.01)

(52) U.S. Cl.
CPC .......... *H04L 63/0281* (2013.01); *H04L 47/19* (2013.01); *H04L 63/0263* (2013.01); *H04L 67/28* (2013.01)

(58) Field of Classification Search
CPC .. H04L 63/0281; H04L 47/19; H04L 63/0263
(Continued)

(56) References Cited

U.S. PATENT DOCUMENTS 7,394,756 B1 * 7/2008 Cook ...................... H04L 45/04
370/216
2001/0043571 A1 * 11/2001 Jang .................... H04L 63/0428
370/260
(Continued)

FOREIGN PATENT DOCUMENTS

| CN | 101695160 A | 4/2010 |
|---|---|---|
| CN | 102118320 A | 7/2011 |
| CN | 102946347 A | 2/2013 |
| CN | 103533060 A | 1/2014 |
| CN | 105245464 A | 1/2016 |

OTHER PUBLICATIONS

Phalguni, "Design of a Firewall Based on Linux Netfilter using ARM9", Sep. 2015, IJSETR, pp. 7744-7748 (Year: 2015).*
(Continued)

*Primary Examiner* — David J Pearson
*Assistant Examiner* — Gregory A Lane (57) ABSTRACT

A method and a device for directing traffic are provided. The method includes: determining whether a tag of a to-be-sent data packet is same as a reference tag configured in a preset matching rule; under situations where a determination result is that tag of the to-be-sent data packet is not the same as the reference tag configured in the preset matching rule, configuring the to-be-sent data packet with the reference tag by redirecting the to-be-sent data packet; sending the to-be-sent data packet configured with the reference tag.

14 Claims, 4 Drawing Sheets

(58) Field of Classification Search
USPC .............................................................. 726/1
See application file for complete search history.

(56) References Cited

U.S. PATENT DOCUMENTS

| | | | | |
|---|---|---|---|---|
| 2003/0091042 | A1* | 5/2003 | Lor ........................ | H04L 63/101 370/389 |
| 2004/0083372 | A1* | 4/2004 | Williamson ........... | G06F 21/566 713/188 |
| 2005/0204169 | A1* | 9/2005 | Tonnesen ............. | H04L 63/1425 726/5 |
| 2006/0262916 | A1* | 11/2006 | Marascio ............ | H04L 65/1043 379/201.01 |
| 2010/0125901 | A1* | 5/2010 | Bathrick .............. | H04L 67/2819 726/13 |
| 2014/0282542 | A1* | 9/2014 | Smith ................... | G06F 9/4411 718/1 |
| 2015/0358288 | A1* | 12/2015 | Jain ...................... | H04L 63/0254 726/13 |
| 2017/0171159 | A1* | 6/2017 | Kumar ................. | H04L 63/0281 |
| 2018/0115471 | A1* | 4/2018 | Curcio ................. | H04L 63/0263 |

OTHER PUBLICATIONS

The China National Intelleectual Property Administration (CNIPA) The China Search Report for 201610510950.8 dated Sep. 5, 2018 10 Pages.

The European Patent Office (EPO) The Extended European Search Report for 16907091.9 (PCT/CN2016/106056) dated Mar. 18, 2019 19 Pages.

Anonymous, "Transparent Proxy with Linux and Squid mini-HOWTO : Transparent Proxy to a Remote BOX," Mar. 17, 2016, XP055566197, Retrieved from the Internet : URL:https://web.archive.org/web/20160317141148/ http://tldp. org/HOWTO/TransparentProxy-6.html, [retrieved on Mar. 7, 2019] , pp. 1-3.

"OpenFlow Switch Specification version 1.5.0", Dec. 19, 2014, Open Networking Foundation, XP055272239, Retrieved from the Internet : URL:https://www.opennetworking.org/images/stories/downloads/sdn-resources/onf-specifications/openflow/openflow-switch-v1.5.0.noipr.pdf, [retrieved on May 12, 2016], pp. 1-277.

The World Intellectual Property Organization (WIPO) International Search Report for PCT/CN2016/106056 dated Mar. 21, 2017 5 Pages.

* cited by examiner

METHOD AND DEVICE FOR DIRECTING TRAFFIC

CROSS-REFERENCES TO RELATED APPLICATIONS

This application is a national phase entry under 35 U.S.C § 371 of International Application No. PCT/CN2016/106056, filed on Nov. 16, 2016, which claims priority of Chinese Patent Application No. 201610510950.8, filed with the State Intellectual Property Office of P. R. China on Jun. 30, 2016, the entire contents of all of which are incorporated herein by reference.

FIELD OF THE DISCLOSURE

The present disclosure relates to the application field of communication technologies and, more particularly, relates to a method and a device for directing traffic.

BACKGROUND

As mobile terminals become intelligent, the types of application programs applicable to the intelligent mobile terminals are diversified. Thus, how to improve the data transmission efficiency of the application programs during the running process of the application programs becomes an issue need to be solved recently.

In particular, there are two important stages in accelerating an Android application: one is to direct the data packet sent by the application to a local proxy; the other is to perform acceleration control of the data packet sent by the application based on the acceleration whitelist. The network firewall Iptables is a tool of the Linux system that manages the network filter Netfilter. The Netfilter is at an IP layer of the Transmission Control Protocol/Internet Protocol (TCP/IP) protocol stack, and performs operations such as filtering and re-directing on the network data packet by configuring the Iptables rules. The Android applications can be divided into ordinary applications and system applications, and the system may assign uid for all applications to manage the permission of applications. While the ordinary application has a unique uid, which is different from each other starting from 10000, the system applications have a uniform uid of 1000. The system applications are often applications that require permission to perform silent installation, resident service, and network management, etc., such as the system application of which the local proxy requires resident service, the system application of which the application marketplace requires silent installation, and the system application of which the Launcher is the startup launcher.

The directing of the data packet send by the application to the local proxy is often realized by adding the Iptables redirection rules. The Netfilter functions at the IP layer, and it is hardly possible to differentiate data packet sent by the to-be-accelerated application and the data packet sent by the local proxy merely depending on the redirection rules. The data packet sent by the local proxy may be once again redirected to the local proxy via the Netfilter, which results in an endless loop.

Directed towards the above-described issues, the service port of the acceleration server may be filtered by configuring the Iptables rules; however, though the data packet sent by the local proxy to the acceleration server will not be redirected once again, such approach has many limitations. That is, when the port accessed by the application is consistent with the port of the acceleration server, the traffic cannot enter the local proxy for acceleration processing and, further, the data packet sent back to source by the local proxy may result in the endless loop because the port is no longer the port of the acceleration server. The aforementioned method thus can only perform full acceleration processing on the data packet that is redirected to the local proxy, and cannot control whether or not to perform acceleration on the applications of the acceleration whitelist.

Directed towards the above-described issues in which the application efficiency of the acceleration products is affected by the fact that the acceleration solutions in related technologies fails to satisfy the acceleration control demands on different applications and that the system applications cannot be accelerated, so far no effective solution has been proposed.

BRIEF SUMMARY OF THE DISCLOSURE

The present disclosure provides a method and a device for directing traffic so as to at least solve the technical issues in which the application efficiency of the acceleration products is affected by the fact that the acceleration solution in related technologies fails to satisfy the acceleration control demands on different applications and that the system applications cannot be accelerated.

According to one aspect of the present disclosure, a method for directing traffic is provided, including: determining whether a tag of a to-be-sent data packet is same as a reference tag configured in a preset matching rule; under situations where a determination result is that the tag of the to-be-sent data packet is not the same as the reference tag configured in the preset matching rule, configuring the to-be-sent data packet with the reference tag by redirecting the to-be-sent data packet; sending out the to-be-sent data packet configured with the reference tag.

According to another aspect of the present disclosure, a device for directing traffic is provided, including: a determination module, configured to determine whether a tag of a to-be-sent data packet is same as a reference tag configured in a preset matching rule; a configuration module, configured to configure the to-be-sent data packet with the reference tag by redirecting the to-be-sent data packet under situations where a determination result is that the tag of the to-be-sent data packet is not the same as the reference tag configured in the preset matching rule; a first sending module, configured to send out the to-be-sent data packet configured with the reference tag.

In embodiments of the present disclosure, whether the tag of the to-be-sent data packet is the same as the reference tag configured in the preset matching rule is determined; under situations where the determination result is that the tag of the to-be-sent data packet is not the same as the reference tag configured in the preset matching rule, the to-be-sent data packet is configured with the reference tag by redirecting the to-be-sent data packet; and the to-be-sent data packet configured with the reference tag is sent. Thus, the objective of differentiating the data packets sent by the application program and sent by the local proxy is achieved, and the technical effects of performing acceleration control on different applications are realized. Further, the issues of application efficiency of the acceleration products being affected by the fact that the acceleration solutions in related technologies fails to satisfy the acceleration control demands on different applications and that the system applications cannot be accelerated may be solved.

BRIEF DESCRIPTION OF THE DRAWINGS

The accompanying drawings illustrated herein are used to provide further understanding of the present disclosure, thus forming a part of the present disclosure. Exemplary embodiments of the present disclosure and illustrations thereof are used to describe the present disclosure without forming inappropriate limitations on the present disclosure. In the accompanying drawings.

DETAILED DESCRIPTION

To make those skilled in the relevant art better understand solutions of the present disclosure, the technical solutions of the present disclosure are described in a clear and complete manner with reference to the accompanying drawings of the present disclosure. Obviously, the embodiments described herein are merely some embodiments of the present disclosure, but not entire embodiments. Based on embodiments of the present disclosure, all other embodiments derived by those ordinarily skilled in the relevant art without creative labor shall all fall within the protection scope of the present disclosure.

It should be noted that, in the specification, claims, and accompanying drawings of the present disclosure, terms such as "first" and "second" are merely used to differentiate similar objects, but are not intended to describe a certain order or sequence. It should be understood in such a way that the applied data may be exchangeable under appropriate situations, such that the embodiments of the present disclosure described herein may be implemented through orders illustrated or described herein. Further, the terms "including", "comprising" or any other variations are intended to cover non-exclusive including. For example, the process, method, article, or device including a series of steps or units are not necessarily limited to those clearly listed steps or units, but may include other steps or units intrinsic to the process, method, article or device that are not clearly listed.

Embodiment 1

According to embodiments of the present disclosure, a method for directing traffic is provided. It should be noted that the steps illustrated in the flow chart(s) of the accompanying drawings may be executed in a computer system containing a set of computer-executable instructions. Further, though logic orders are depicted in the flow chart, under certain circumstances, the illustrated or described steps may be executed in orders different from that provided herein.

Figure 1:
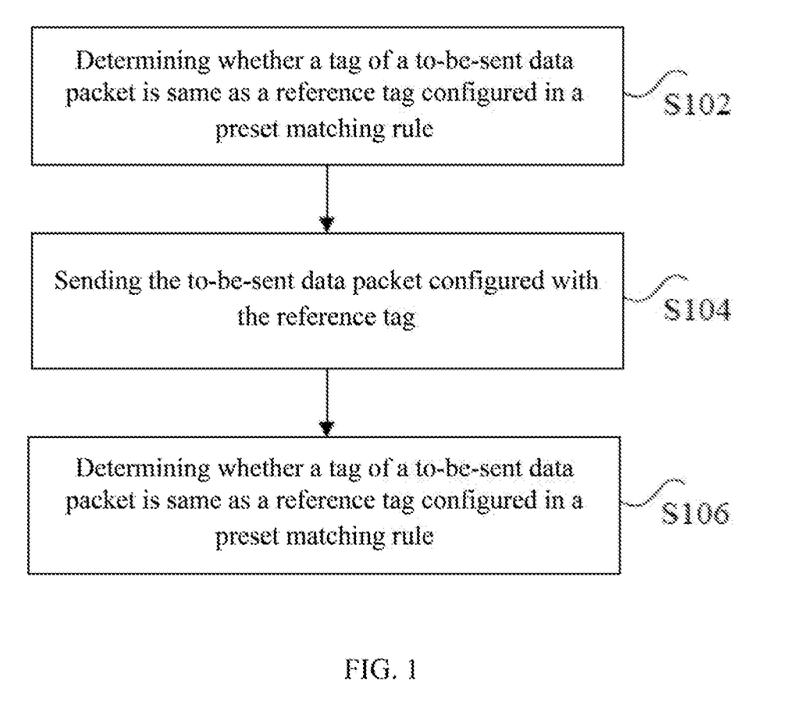
FIG. 1 illustrates a schematic flow chart of a method for directing traffic according to embodiments of the present disclosure.

FIG. 1 illustrates a schematic flow chart of a method for directing traffic according to embodiments of the present disclosure. As shown in FIG. 1, the method includes the following steps:

Step S102: determining whether a tag of a to-be-sent data packet is same as a reference tag configured in a preset matching rule.

More specifically, the method for directing traffic provided by the present disclosure may be applicable to a mobile terminal for acceleration processing process of various applications. In some embodiments, given a terminal device suitable for an Android system as an example, the disclosed terminal device may include: smart cellphone, tablet, handheld commerce and wearable device.

During the process of accelerating various applications of the terminal device provided by the present disclosure, the Netfilter at the IP layer of the terminal device may first differentiate between the to-be-sent data packets of the various applications through a preset matching rule, where the disclosed preset matching rule includes a mark tag matching rule and a redirection rule that are configured by the network firewall iptables. During the process in which matching between the received to-be-sent data packet and the preset matching rule is performed, whether the to-be-sent data packet carries a reference tag that matches the mark tag matching rule configured by the iptables is determined. Assume the reference tag during implementation of the present disclosure is a port number and the matching rule performs a matching operation using the port number, whether the reference tag of the to-be-sent data packet is the same as the acceleration port number configured in the preset matching rule is determined. That is, assume the reference tag of the to-be-sent data packet is denoted as mark=8123, and the acceleration port number configured by the matching rule is mark=X, whether 8123 equals to X is determined. Under situations where the determination result is that 8123 does not equal to X, step S104 is executed, and under situations where the determination result is that 8123 equals to X, step S103 is executed.

Step S104, under situations where a determination result is not the same as the reference tag configured in the preset matching rule, configuring the to-be-sent data packet with the reference tag by redirecting the to-be-sent data packet.

More specifically, under situations where, based on step S102, the determination result of whether the to-be-sent data packet carries the reference tag turns out to be that the to-be-sent data packet does not carry the reference tag, the Netfilter at the IP layer of the terminal device may redirect the to-be-sent data packet to the local proxy. The local proxy may configure the reference tag for the to-be-sent data packet, thereby preventing the data packet sent by the local proxy in related technologies from being once again redirected to the local proxy through the Netfilter.

Step S106, sending the to-be-sent data packet configured with the reference tag.

More specifically, the to-be-sent data packet may be configured with the reference tag based on step S104, and when the Netfilter performs, for a second time, the matching operation described at step S102 on the to-be-sent data packet carrying the reference tag, it may be determined that the reference tag of the to-be-sent data packet is the same as the preset matching condition. Further, the to-be-sent data packet is sent to the next route (i.e., the next transmission path) through a network card.

Figure 2:
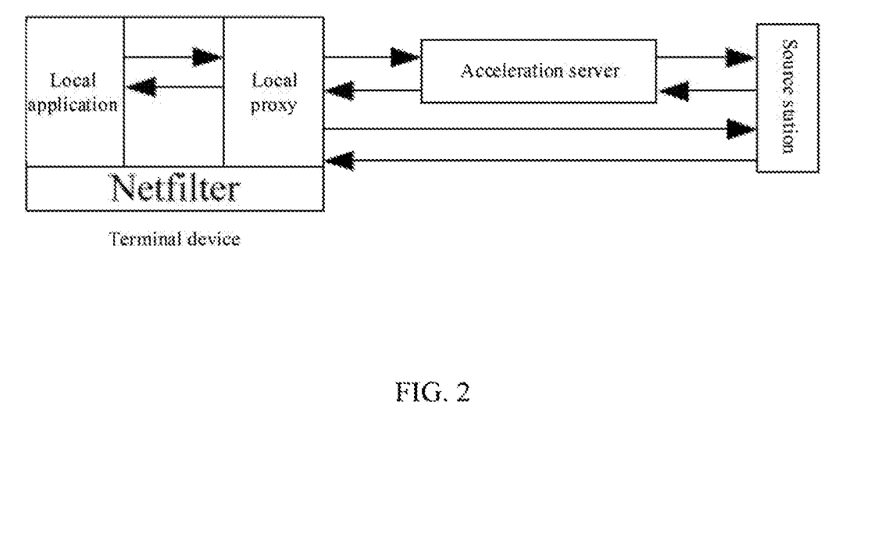
FIG. 2 illustrates a schematic view of an application scenario of a method for directing traffic according to embodiments of the present disclosure.

With reference to step S102~step S106, FIG. 2 illustrates a schematic view of an application scenario of a method for directing traffic according to embodiments of the present disclosure. As shown in FIG. 2, the method for directing traffic provided by the present disclosure is applicable to a terminal device. During the implementation process of the method for directing traffic, the terminal device is specifically configured as follows:

At Step1, the terminal device is installed with a local proxy and applications to be accelerated, both of which are located at an application layer;

At Step2, Netfilter is at the IP layer, which performs operations such as filtering and re-directing on a data packet;

At Step3, after receiving the data packet, the local proxy determines whether the data packet needs to be accelerated, proxies the data packet that needs to be accelerated to an acceleration server, and proxies the data packet that does not need to be accelerated to a source station and, further, configures the mark tag at the proxy socket;

At Step4, the acceleration server or the source station sends a response to the local proxy, and the local proxy forwards the response to a corresponding application.

In the method for directing traffic provided by the present disclosure, whether the tag of the to-be-sent data packet is same as the reference tag configured in the preset matching rule is determined; under situations where the determination result is that the tag of the to-be-sent data packet is not the same as the reference tag configured in the preset matching rule, the to-be-sent data packet is configured with the reference tag by redirecting the to-be-sent data packet; and the to-be-sent data packet configured with the reference tag is sent. Thus, the objective of differentiating between the data packets sent by the application program and sent by the local proxy is achieved, such that the technical effects of performing acceleration control of different applications are realized. Further, the issues of the application efficiency of the acceleration products being affected by the fact that the acceleration solution in related technologies fails to satisfy the acceleration control demands on different applications and that the system applications cannot be accelerated may be solved.

Optionally, when the preset matching rule further includes the redirection rule, configuring the to-be-sent data packet with the reference tag by redirecting the to-be-sent data packet at step S104 may include:

Step1, based on the redirection rule, redirecting the to-be-sent data packet to the local proxy possessing a function of labeling the reference tag.

Specifically, under the situation where the reference tag of the to-be-sent data packet does not match the matching rule in the preset matching rule, the to-be-sent data packet is redirected to the local proxy labeled with the reference tag. The Netfilter of the terminal device in the present disclosure may redirect the to-be-sent data packet that does not match the preset matching rule to the local proxy of the terminal device.

Step2, configuring the to-be-sent data packet with the reference tag through a preset socket configuration function.

Specifically, based on the redirection of the to-be-sent data packet at Step1, the local proxy configures the to-be-sent data packet with the reference tag through the preset socket configuration function SetScokopt. For example, the tag, i.e., the reference tag 8123 may be configured for the to-be-sent data packet.

Optionally, configuring the to-be-sent data packet with the reference tag through the preset socket configuration function at Step2 may include:

Step A, creating a corresponding socket for the to-be-sent data packet;

Step B, based on the preset socket configuration function, configuring the socket with the reference tag.

Specifically, with reference to step A and step B, the local proxy creates a proxy socket (i.e., socket) for the received to-be-sent data packet, and uses the socket configuration function of Linux, i.e., the setsocketopt function, to configure the socket with a tag of mark=8123.

Optionally, after determining whether the tag of the to-be-sent data packet is same as the reference tag configured in the preset matching rule at step S102, the disclosed method for directing traffic further includes:

Step S103, under situations where the determination result is that the tag of the to-be-sent data packet is same as the reference tag configured in the preset matching rule, sending out the to-be-sent data packet carrying the reference tag without redirection to the local proxy.

Specifically, different from step S104, under the situation where the reference tag carried by the to-be-sent data packet is the same as the reference tag in the preset matching rule, the local proxy sends the to-be-sent data packet that carries the reference tag. The local proxy may, based on the application type of the to-be-sent data packet, send the to-be-sent data packet to the acceleration server or the source station.

Figure 3:
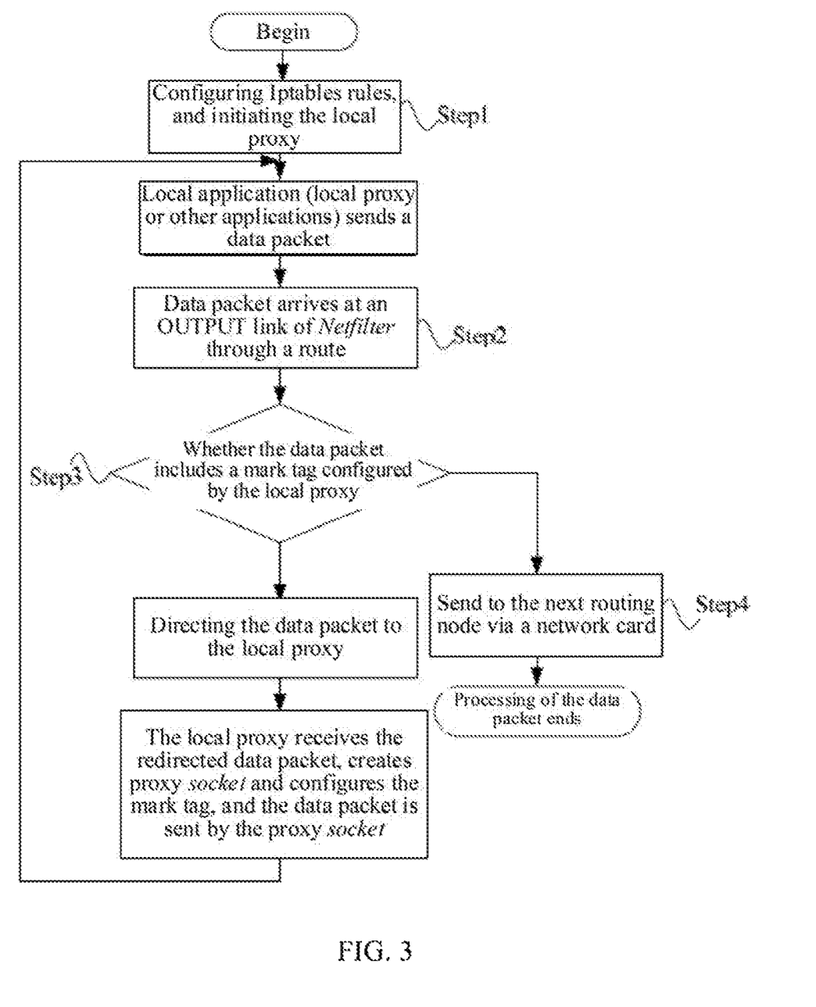
FIG. 3 illustrates a schematic flow chart of a method for directing traffic according to embodiments of the present disclosure.

As such, with reference to step S102~step S106, FIG. 3 illustrates a schematic flow chart of a method for directing traffic according to embodiments of the present disclosure. As shown in FIG. 3, the specific method for directing traffic provided by the present disclosure may be as follows.

Firstly, the disclosed iptables configures the mark tag matching rule and the redirection rule (i.e., Step1 in FIG. 3), where the mark tag matching rule and the redirection rule are as follows:

mark tag matching rule: iptables-t nat-A OUTPUT-m mark-mark 8123-j RETURN;

redirection rule: iptables-t nat-A OUTPUT-p tcp-j REDIRECT-to-port 8123, where the function of the redirection rule is to redirect the data packet to the port 8123.

When the data packet includes the tag of mark=8123, the matching rule is matched, and the data packet may not be redirected but be processed in a system default manner; the local proxy is initiated and listens on port 8123 to receive the redirected data packet.

Secondly, the data packet sent by the application (including the local proxy) arrives at the OUTPUT link of Netfilter through a route, and the Netfilter may process the data packet based on the property of the data packet, as well as the mark tag matching rule and the redirection rule. The data packet that is not sent by the local proxy (mark !=8123) may be redirected to the port 8123 listened by the local proxy (i.e., Step2 in FIG. 3).

Thirdly, after receiving the data packet, the local proxy creates the proxy socket, uses the setsocketopt function of the Linux to configure the socket with the tag of mark=8123, determines whether the data packet needs to be accelerated, and forwarded the data packet to the acceleration server or the source station (i.e., Step3 in FIG. 3). At Step3, the local proxy receives the redirected data packet, creates the proxy socket, configures the mark tag, and sends out the data packet through the proxy socket.

Fourthly, the data packet sent out by the local proxy arrives at the OUTPUT link of the Netfilter through a route, is matched with the mark tag matching rule, and is sent to a next route through the network card (i.e., Step4 in FIG. 3).

As such, by relying on the mark tag to differentiate between the data packets sent by the local proxy, the method for directing traffic provided by the present disclosure is able to perform full acceleration control on the data packet sent by the application. Accordingly, the disability of acceleration in response to the destination port accessed by the application being coupled with the port of the acceleration server caused by the configuration of the iptables filtering rule (port filtration) may be avoided. The local proxy has the same uid as other system applications, and to prevent the data packet sent by the local proxy from being redirected once again, the filtering rule of uid of the local proxy may also be configured. But, the local proxy is a system application, the uid of which can be coupled with the uid of other system applications, such that the system applications cannot be accelerated. By applying the approach that configures the mark tag, the data packets sent by the local proxy can be differentiated without limitations on the application properties, which implements the acceleration control of the system applications.

Further, the method for directing traffic provided by the present disclosure may not change the key modules such as Netfilter and TCP/IP protocol stack of the Linux, and the system does not need to be customized, which saves the development cost.

Embodiment 2

Figure 4:
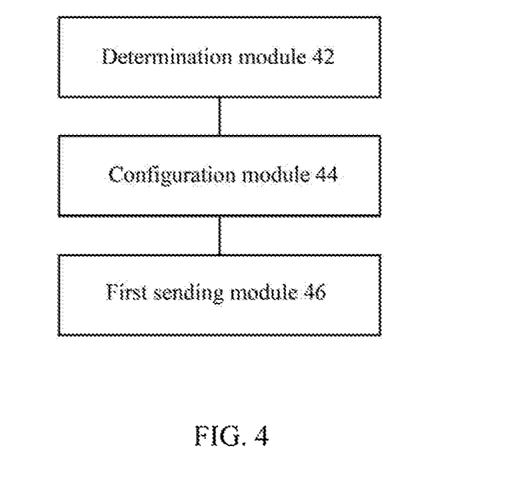
FIG. 4 illustrates a schematic structural view of a device for directing traffic according to embodiments of the present disclosure.

According to the present disclosure, a device for directing traffic is provided. FIG. 4 illustrates a schematic structural view of a device for directing traffic according to embodiments of the present disclosure. As shown in FIG. 4, the device includes: a determination module 42, a configuration module 44, and a first sending module 46.

The determination module 42 is configured to determine whether a tag of a to-be-sent data packet is same as a reference tag configured in a preset matching rule.

The configuration module 44 is configured to configure the to-be-sent data packet with the reference tag by redirecting the to-be-sent data packet under situations where a determination result is that the tag of the to-be-sent data packet is not same as the reference tag configured in the preset matching rule.

The first sending module 46 is configured to send the to-be-sent data packet configured with the reference tag.

In the device configured with the tag Mark according to the present disclosure, whether the tag of the to-be-sent data packet is same as the reference tag configured in the preset matching rule is determined; under situations where the determination result is that the tag of the to-be-sent data packet is not the same as the reference tag configured in the preset matching rule, the to-be-sent data packet is configured with the reference tag by redirecting the to-be-sent data packet; and the to-be-sent data packet configured with the reference tag is sent. Thus, the objective of differentiating between the data packets sent by the application program and sent by the local proxy is achieved, such that the technical effects of performing acceleration control of different applications are realized. Further, the issues of the application efficiency of the acceleration products being affected by the fact that the acceleration solutions in related technologies fails to satisfy the acceleration control demands on different applications and that the system applications cannot be accelerated may be solved.

Figure 5:
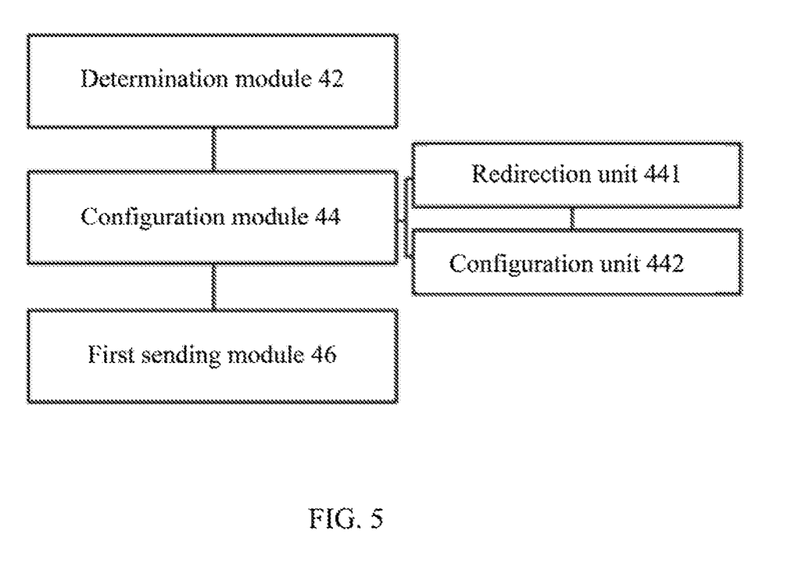
FIG. 5 illustrates a schematic structural view of another device for directing traffic according to embodiments of the present disclosure.

Optionally, FIG. 5 illustrates a schematic structural view of another device for directing traffic according to embodiments of the present disclosure. As shown in FIG. 5, the configuration module 44 includes a redirection unit 441 and a configuration unit 442.

The redirection unit 441 is configured to, under situations where the preset matching rule includes a redirection rule, redirect the to-be-sent data packet to the local proxy that possesses the function of labeling the reference tag based on the redirection rule.

The configuration unit 442 is configured to configure the to-be-sent data packet with the reference tag through a preset socket configuration function.

Figure 6:
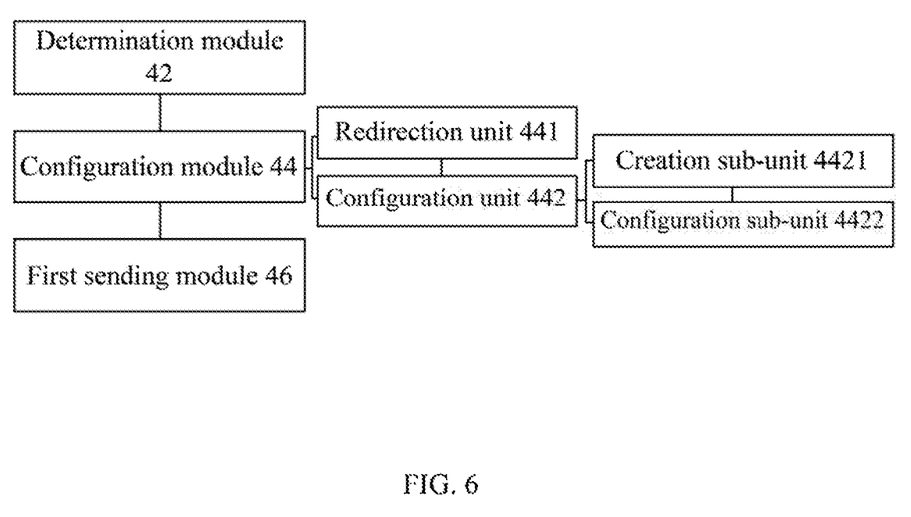
FIG. 6 illustrates a schematic structural view of another device for directing traffic according to embodiments of the present disclosure.

Optionally, FIG. 6 illustrates a schematic structural view of another device for directing traffic according to embodiments of the present disclosure. As shown in FIG. 6, the configuration unit 442 includes: a creation sub-unit 4421 and a configuration sub-unit 4422.

The creation sub-unit 4421 is configured to create a corresponding socket for the to-be-sent data packet.

The configuration sub-unit 4422 is configured to, based on a preset socket configuration function, configure the socket with the reference tag.

Figure 7:
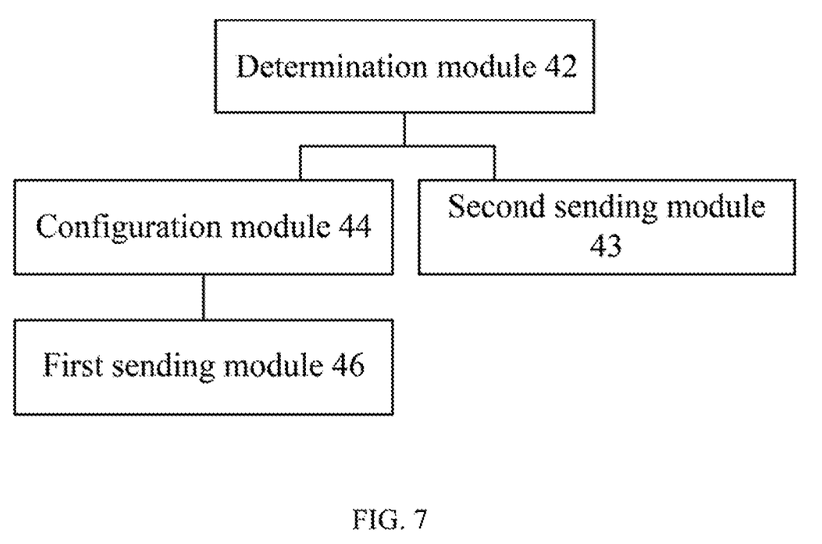
FIG. 7 illustrates a schematic structural view of another device for directing traffic according to embodiments of the present disclosure.

Optionally, FIG. 7 illustrates a schematic structural view of another device for directing traffic according to embodiments of the present disclosure. As shown in FIG. 7, the device for directing traffic provided by the present disclosure further includes a second sending module 43.

The second sending module 43 is configured to, under situations where the determination result is that the tag of the to-be-sent data packet is the same as the reference tag configured in the preset matching rule, send out the to-be-sent data packet carrying the reference tag without redirection to the local proxy.

The foregoing reference numbers of the embodiments of the present disclosure are for illustration only, which do not represent preference of the embodiments.

In the aforementioned embodiments of the present disclosure, descriptions of each embodiment has corresponding focus, and portions of a certain embodiment not described in details may find related descriptions in other embodiments for reference.

In various embodiments of the present disclosure, it should be understood that the disclosed technical solutions may be implemented by other manners. In other words, the device embodiments described above are merely for illustrative purposes. For example, the units may be merely partitioned by logic function. In practice, other partition manners may also be possible. For example, various units or components may be combined or integrated into another system, or some features may be omitted or left unexecuted. Further, mutual coupling or direct coupling or communication connection displayed or discussed therebetween may be via indirect coupling or communication connection of some communication ports, devices, or units, in electrical or other manners.

Units described as separated components may or may not be physically separated, and the components displayed as units may or may not be physical units. That is, the components may be located at one position or may be distributed over various units. Optionally, some or all of the units may be selected to realize the purpose of solutions of embodiments herein according to practical needs.

Further, each functional unit in each embodiment of the present disclosure may be integrated in one processing unit, or each unit may exist physically and individually, or two or more units may be integrated in one unit. The aforementioned integrated units may be implemented as in the form of hardware, or implemented using the form of software function units.

When the described integrated units are implemented using the form of software function units, and are sold or used as independent products, they may be stored in a computer accessible storage medium. Based on such understanding, the technical solutions of the present disclosure, or the portions contributing to the prior art may be embodied in the form of a software product. The computer software product may be stored in a storage medium, and include several instructions to instruct a computer device (e.g., a personal computer, a server, or a network device) to execute all or some of the method steps of each embodiment. The storage medium described above may include flash drive, read-only memory (ROM), random access memory (RAM), a portable disc, a magnetic disc, an optical disc or various other media that may store program codes.

The foregoing is only preferred implementation methods of the present disclosure, and it should be noted that, without departing from the spirit of the present disclosure, various improvements or modifications may be obtained by those ordinarily skilled in the relevant art. Such improvements and modifications shall all fall within the protection scope of the present disclosure.

What is claimed is:

1. A method for directing traffic, applied to a terminal device installed with a local proxy, comprising:
   determining, by Netfilter at an internet protocol (IP) layer of the terminal device, whether a tag of a to-be-sent data packet is same as a reference tag configured in a preset matching rule, wherein the to-be-sent data packet is sent by an application program of the terminal device or the local proxy;
   in response to the tag of the to-be-sent data packet being different from the reference tag configured in the preset matching rule, redirecting, by the by Netfilter, the to-be-sent data packet to the local proxy that possesses a function of labeling the reference tag to configure the to-be-sent data packet with the reference tag;
   in response to the tag of the to-be-sent data packet being the same as the reference tag configured in the preset matching rule, sending, by the Netfilter at the IP layer of the terminal device, the to-be-sent data packet configured with the reference tag to a next route through a network card; and
   determining, by the local proxy, whether the to-be-sent data packet needs to be accelerated;
   in response to the to-be-sent data packet needing to be accelerated, proxying the to-be-sent data packet configured with the reference tag to an acceleration server;
   in response to the to-be-sent data packet not needing to be accelerated, proxying the to-be-sent data packet configured with the reference tag to a source station.

2. The method according to claim 1, when the preset matching rule includes a redirection rule, configuring the to-be-sent data packet with the reference tag by redirecting the to-be-sent data packet comprises:
   based on the redirection rule, redirecting the to-be-sent data packet to the local proxy that possesses a function of labeling the reference tag; and
   configuring, by the local proxy, the to-be-sent data with the reference tag through a preset socket configuration function.

3. The method according to claim 2, configuring, by the local proxy, the to-be-sent data with the reference tag through the preset socket configuration function comprises:
   creating, by the local proxy, a corresponding socket for the to-be-sent data packet; and
   based on the preset socket configuration function, configuring the socket with the reference tag.

4. The method according to claim 1, after determining whether the tag of the to-be-sent data packet is the same as the reference tag configured in the preset matching rule, the method further comprises:
   in response to the tag of the to-be-sent data packet being the same as the reference tag configured in the preset matching rule, sending the to-be-sent data packet carrying the reference tag without redirection to the local proxy.

5. The method according to claim 1, wherein:
   the preset matching rule is configured by iptables.

6. The method according to claim 1, wherein the determining whether a tag of a to-be-sent data packet is same as a reference tag configured in a preset matching rule comprises:
   determining, by the Netfilter, whether the to-be-sent data packet carries the reference tag configured in the preset matching rule.

7. The method according to claim 1, wherein:
   the reference tag configured in the preset matching rule is a port number of a port that the local proxy listens on.

8. The method according to claim 1, wherein the sending the to-be-sent data packet configured with the reference tag further comprises:
   sending, by the local proxy, the to-be-sent data packet with the reference tag, such that the to-be-sent data packet with the reference tag arrives at an OUTPUT link of the Netfilter through a route, and
   sending, by the network card, the to-be-sent data packet to the next route.

9. A terminal device for directing traffic, wherein the terminal device is installed with a local proxy, the terminal device comprising a memory for storing instructions, and when the instructions being executed, the terminal device is configured to:
   determine whether a tag of a to-be-sent data packet is same as a reference tag configured in a preset matching rule by Netfilter at an internet protocol (IP) layer of the terminal device, wherein the to-be-sent data packet is sent by an application program of the terminal device or the local proxy;
   in response to the tag of the to-be-sent data packet being different from the reference tag configured in the preset matching rule, redirect the to-be-sent data packet to the local proxy that possesses a function of labeling the reference tag to configure the to-be-sent data packet with the reference tag;
   in response to the tag of the to-be-sent data packet being the same as the reference tag configured in the preset matching rule, sending, by the Netfilter at the IP layer of the terminal device, the to-be-sent data packet configured with the reference tag to a next route through a network card; and
   determine, by the local proxy, whether the to-be-sent data packet needs to be accelerated;
   in response to the to-be-sent data packet needing to be accelerated, proxy the to-be-sent data packet configured with the reference tag to an acceleration server;
   in response to the to-be-sent data packet not needing to be accelerated, proxy the to-be-sent data packet configured with the reference tag to a source station.

10. The terminal device according to claim 9, further configured to:
    when the preset matching rule includes a redirection rule, redirect the to-be-sent data packet to the local proxy that possesses a function of labeling the reference tag based on the redirection rule; and configure the to-be-sent data with the reference tag through a preset socket configuration function.

11. The terminal device according to claim 10, further configured to:
    create a corresponding socket for the to-be-sent data packet; and
    based on the preset socket configuration function, configure the socket with the reference tag.

12. The terminal device according to claim 9, further configured to:
    in response to the tag of the to-be-sent data packet being the same as the reference tag configured in the preset matching rule, send the to-be-sent data packet carrying the reference tag without redirection to the local proxy.

13. The terminal device according to claim 9, wherein: the preset matching rule is configured by iptables.

14. The terminal device according to claim 9, wherein: the reference tag configured in the preset matching rule is a port number of a port that the local proxy listens on.

\* \* \* \* \*